C. REGENBOGEN.
FLUID PRESSURE TURBINE.
APPLICATION FILED MAR. 16, 1904.

953,552.

Patented Mar. 29, 1910.
5 SHEETS—SHEET 1.

WITNESSES:
F. H. Miller
C. L. Belcher

INVENTOR
Conrad Regenbogen
BY
Wesley G. Carr
ATTORNEY

C. REGENBOGEN.
FLUID PRESSURE TURBINE.
APPLICATION FILED MAR. 16, 1904.

953,552.

Patented Mar. 29, 1910.

5 SHEETS—SHEET 2.

WITNESSES:
F. H. Miller.
C. L. Belcher

INVENTOR
Conrad Regenbogen
BY
Wesley G. Carr
ATTORNEY

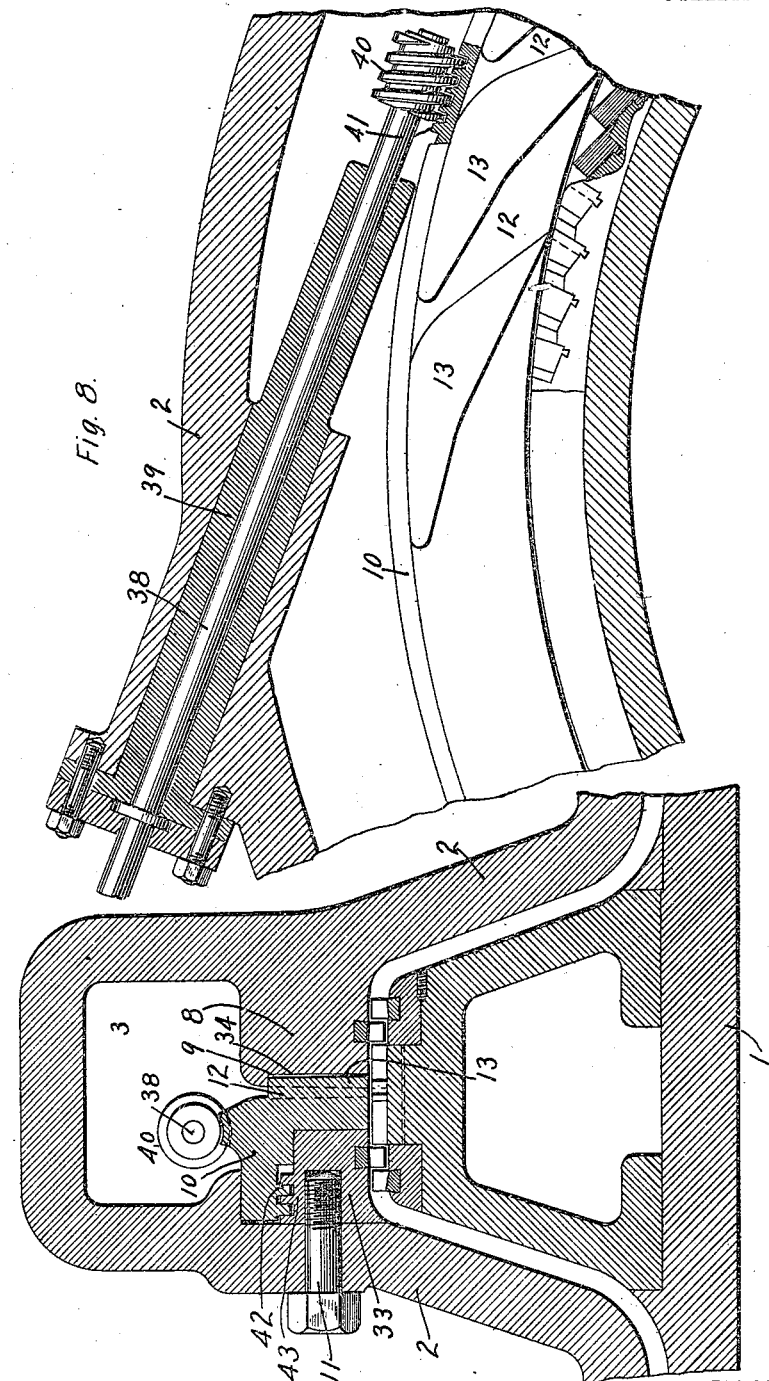

C. REGENBOGEN.
FLUID PRESSURE TURBINE.
APPLICATION FILED MAR. 16, 1904.

953,552.

Patented Mar. 29, 1910.
5 SHEETS—SHEET 4.

WITNESSES:
F. H. Miller
C. L. Belcher

INVENTOR
Conrad Regenbogen
BY
Wesley G. Carr
ATTORNEY

C. REGENBOGEN.
FLUID PRESSURE TURBINE.
APPLICATION FILED MAR. 16, 1904.

953,552.

Patented Mar. 29, 1910.
5 SHEETS—SHEET 5.

WITNESSES:
F. H. Miller
C. L. Belcher

INVENTOR
Conrad Regenbogen
BY
Wesley S. Carr
ATTORNEY

UNITED STATES PATENT OFFICE.

CONRAD REGENBOGEN, OF MANCHESTER, ENGLAND, ASSIGNOR TO THE WESTINGHOUSE MACHINE COMPANY, A CORPORATION OF PENNSYLVANIA.

FLUID-PRESSURE TURBINE.

953,552.          Specification of Letters Patent.      Patented Mar. 29, 1910.

Application filed March 16, 1904. Serial No. 198,505.

*To all whom it may concern:*

Be it known that I, CONRAD REGENBOGEN, a subject of the King of Prussia, and a resident of Manchester, in the county of Lancaster, England, have invented a new and useful Improvement in Fluid-Pressure Turbines, of which the following is a specification.

My invention relates to fluid-pressure turbines, and in particular to turbines of that kind in which steam is caused to pass through a series of flaring nozzles for the purpose of increasing its velocity before impinging on the blades or buckets secured to the rotary portion of the turbine.

One of the objects of my invention is to provide an improved construction whereby the steam is prevented from impinging upon a part of the moving blades where it can do no useful work.

Another object of my invention is to provide an especially simple and efficient construction of the nozzles and of the moving blades or buckets.

A further object of my invention is to provide means for varying the dimensions of the nozzles of steam turbines whereby the velocity of the steam may be so adjusted as to obtain the best efficiency at a given speed of the turbine and whereby the speed of the turbine may be varied or governed.

My improved constructional arrangements are shown in the accompanying drawings, which will also assist in the comprehension of those parts of my invention which are not limited to constructional details.

Figure 1:
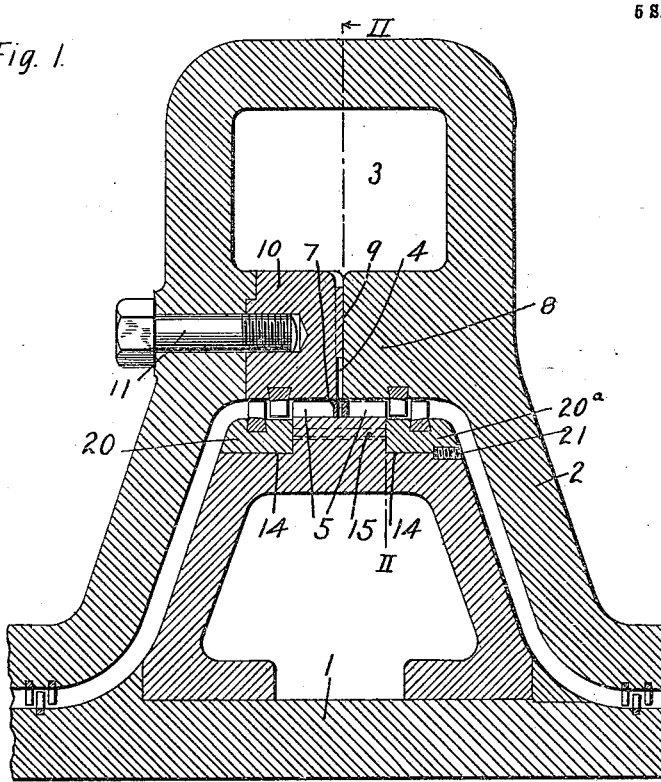
Figure 2:
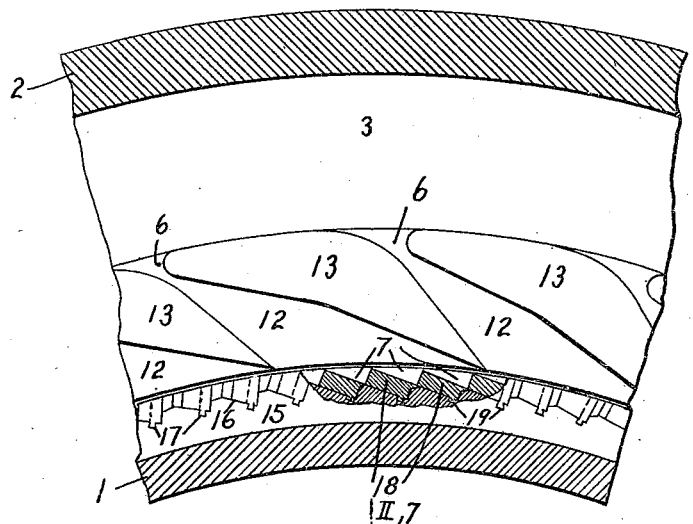
Figure 3:
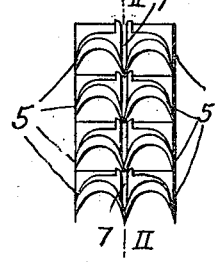
Figure 4:
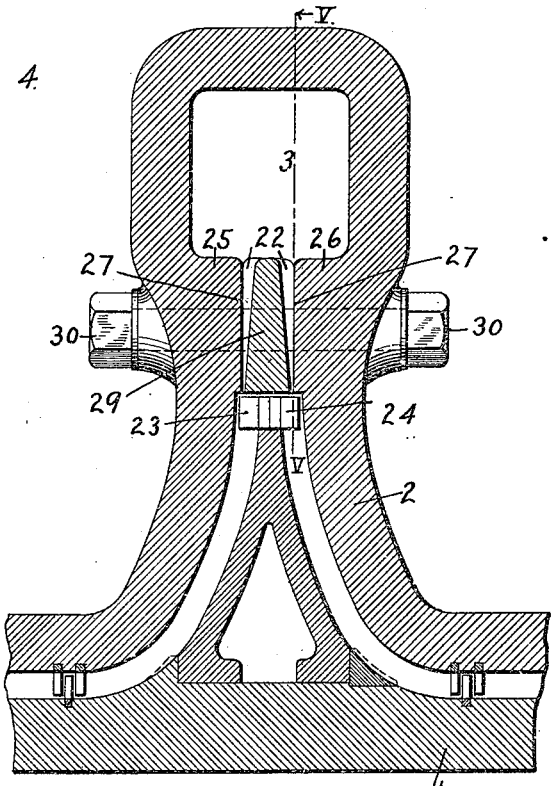
Figure 5:
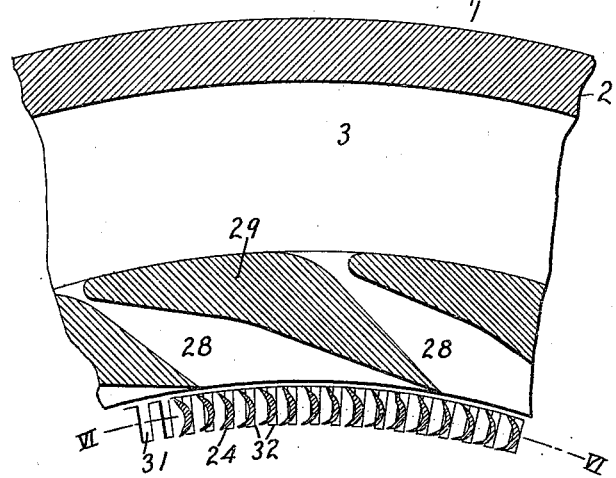
Figure 6:
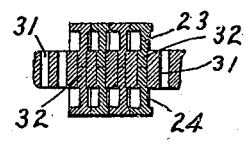
Figure 9:
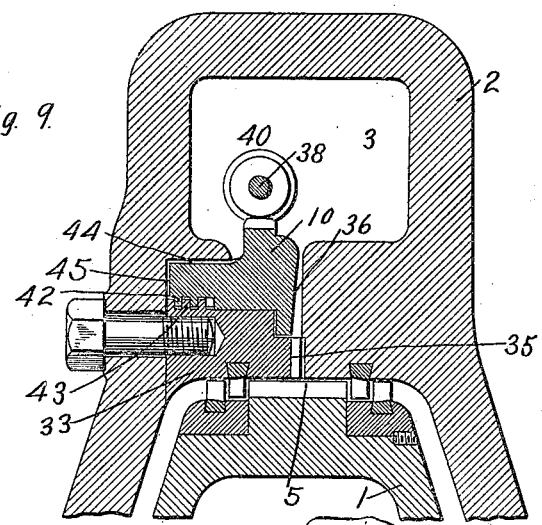
Figure 10:
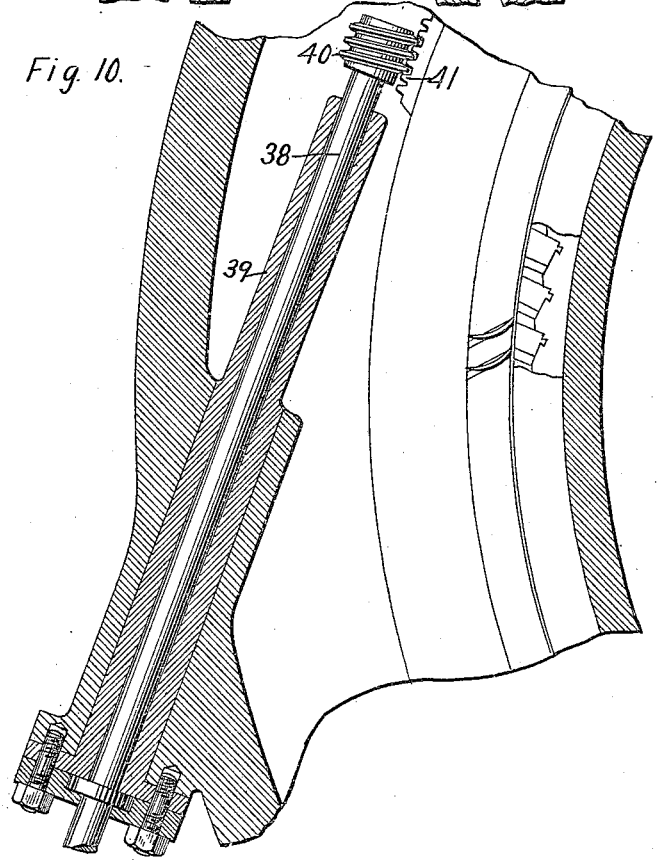
Figure 11:
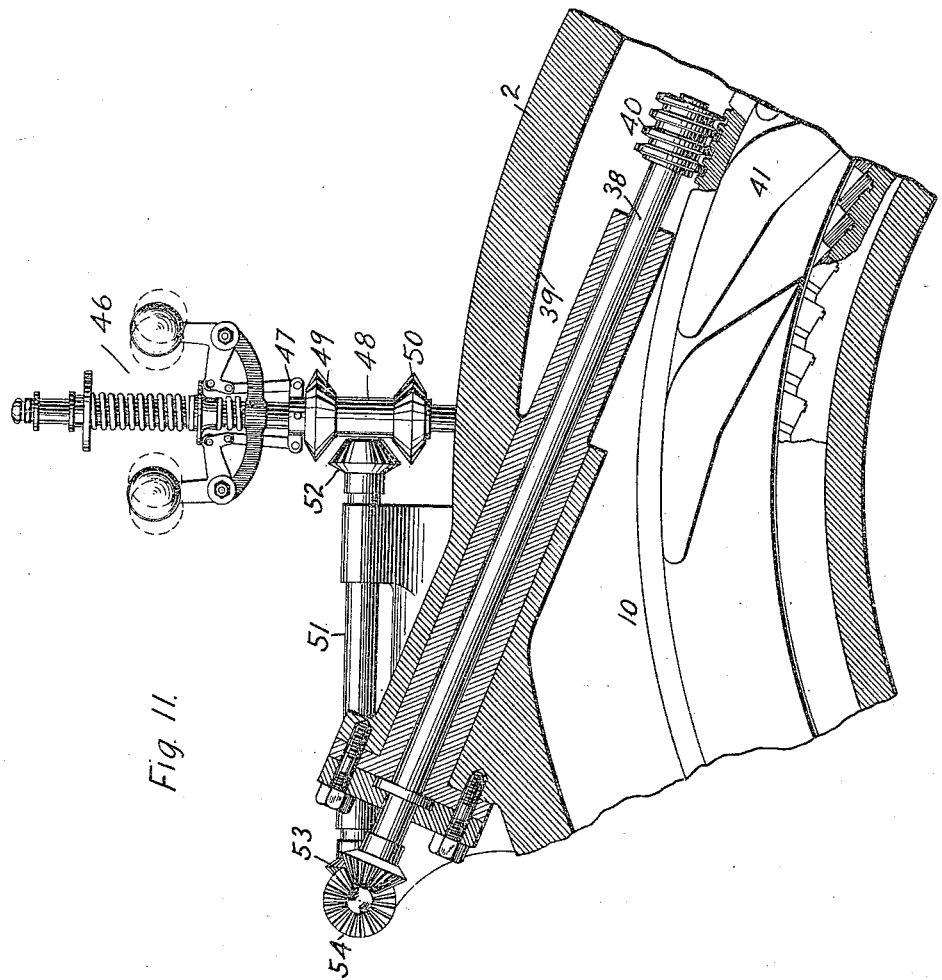

Figure 1 is a portion of a central section through the axis of a steam turbine embodying some of my improved constructions. Fig. 2 is a section on the line II—II of Fig. 1, looking in the direction of the arrow. Fig. 3 is a plan of a part of the rotary portion of the turbine developed into a plane and showing the blades or buckets. Fig. 4 is a view similar to Fig. 1, illustrating a turbine provided with twin nozzles. Fig. 5 is a section on the line V—V of Fig. 4, looking in the direction of the arrow. Fig. 6 is a section on the line VI—VI of Fig. 5, some of the blades being removed. Figs. 7 and 8 are views similar to Figs. 1 and 2, respectively, and showing one means for varying the dimensions of the nozzles. Figs. 9 and 10 are views similar to those of Figs. 7 and 8, respectively, but showing another means for varying the dimensions of the nozzles. Fig. 11 is a sectional view corresponding to Figs. 8 and 10, but showing an automatic governor and means actuated thereby for varying the dimensions of the nozzles.

Referring now to Figs. 1, 2 and 3, the rotary portion of the turbine is indicated at 1, and the fixed portion at 2. Said fixed portion is provided with an annular channel 3 into which the steam is led from the boiler by a suitable conduit, (not shown), and with nozzles 4 in the inner wall of the channel through which steam is projected against the blades or buckets 5, secured to the rotary portion 1 of the engine. The nozzles are made flaring in a circumferential direction with a constriction or throat, indicated at 6 in Fig. 2, and their outlets form a practically continuous opening through which the steam issues.

In order to prevent the steam impinging on parts of the blades or buckets 5 where it will do no useful work, I provide inclined channels 7 formed in or located between the moving blades which constitute continuations of the nozzles. The width of the channels 7 being practically equal to that of the nozzles, substantially no leakage of steam will occur and the whole volume of the steam will be projected against the working faces of the blades. Furthermore, the friction of the steam flowing through the continuations of the nozzles is made use of in driving the turbine.

My improved construction of the nozzles will be readily understood from Figs. 1 and 2. The casing 2 is provided with a laterally projecting, internal ring 8, having a plane face indicated at 9. Opposite to this face, is a ring 10 secured inside the casing 2 by means of bolts 11 and the face of this ring is provided with slots 12, (Fig. 2), which, in conjunction with the plane face 9, form the nozzles 4. The remaining portion of the face of the ring 10 consists of substantially plane parts 13, which make a steam-tight joint with the face 9 of the ring 8.

The construction of the blades or buckets 5 is as follows: The periphery of the rotary portion 1 is provided with angular recesses 14 on each side, between which is an outwardly projecting ring 15 to support the blades or buckets 5. The ring 15 is provided with a series of transverse channels 16, in the bottom of each of which is a dovetail groove 17, and the blades or buckets, which are made in pairs, as shown in Fig. 3, are each formed with a base piece 18 having a dovetail projection 19 so that they can be readily slipped into place from the side. The blades are maintained in position by means of the rings 20 and 20ª fitting in the recesses 14 of the rotary portion 1, the ring 20 being made taper and shrunk on and the other 20ª being made parallel and fitted well into its place and secured therein by grub screws 21, which act as keys and also maintain the ring in place. By this construction, if it is necessary to replace one or more blades 5 at any time, the ring 20ª may easily be removed for this purpose.

Referring now to Figs. 4, 5 and 6, the turbine therein shown is one in which the direction of the flow of the steam through the first set of blades is radial, and in order to secure the double flow and thereby avoid an end thrust, I provide twin nozzles, indicated at 22, 22, each nozzle delivering steam to its own set of blades 23, 24, carried on the periphery of the rotary portion 1 of the turbine. The construction of these nozzles will be readily understood from the drawings, the casing 2 of the turbine being provided with laterally projecting, internal rings 25, 26, having plane faces 27, and the nozzles being formed by cutting slots 28 in the faces of the intermediate ring 29, which is maintained in position between the rings 25 and 26 by bolts 30. The blades 23, 24, are attached to the rotary portion 1 of the turbine in any suitable manner; for example, I may provide slots 31 in the periphery of the rotary portion to receive the base pieces 32 with which the blades are provided.

According to another part of my invention, I provide means for varying the dimensions of the nozzles whereby I am enabled to adjust the velocity of the steam in accordance with the speed at which it is desired to operate the turbine, thereby obtaining maximum efficiency. Various means may be employed for this purpose, depending upon the manner in which the nozzles are constructed. As an example of how this part of my invention may be carried into practical effect, I will now describe, with reference to Figs. 7 and 8, how the nozzles shown in Figs. 1 and 2 of the drawings may be employed for this purpose.

Broadly speaking, the adjustment is made by varying the distance between the ring 10 and the ring 8, the dimensions of the nozzles being fixed in a circumferential direction. The slots 12 in the ring 10 will be made of a depth greater than the maximum width it is desired to give to the nozzles, and the face 9 of the ring 8 will be made with recesses 34 corresponding in shape to the projections 13 of the ring 10, into which the said projections are received when the ring 10 is moved toward and away from the ring 8. By this means steam will be prevented from passing between the two rings except by way of the nozzles. For effecting movement of the ring 10 toward and away from the ring 8, I provide a shaft 38 rotating in a suitable bearing 39 in the casing 2, said shaft carrying a worm 40 engaging with teeth 41 provided on the periphery of the ring 10. Said ring 10 is also provided with an internal screw-threaded portion 42 which engages with an external screw-thread 43 on a ring 33 that is secured to the casing by bolts 11.

It will be clear from the above description that if the shaft 38 is rotated the ring 10 will be caused to rotate and, by the agency of the screw-threads 42, 43, will be moved endwise toward or away from the ring 8, thereby varying the dimensions of the nozzles in the desired manner.

In the arrangement shown in Figs. 9 and 10, I provide for varying the outer portion only of the nozzles; that is to say, that portion known as the throat which acts to give velocity to the steam. The inner portion of the nozzles is constituted by fixed blades 35, which are secured to the ring 33 in any desired manner and operate to give the proper direction to the issuing steam. The outer and movable ring 10 is formed without projections and is quite smooth on its face 36, as shown. Movement of the ring 10 may be effected by similar means to those hereinbefore described with reference to Figs. 7 and 8.

In order to balance the end thrust acting on the ring 10, I may provide a few longitudinal grooves 44, (Fig. 9), by means of which steam can pass from the inlet 3 to the space 45. Any steam which leaks from this latter space past the screw-threads 42, 43, will be ultimately conducted to the guide blades 35 and be projected against the movable blades 5.

In the case of the twin nozzle construction, shown in Fig. 4 of the drawings, the outer portions of the projecting rings 25, 26, may be separate from the casing 2 instead of being formed in one piece therewith as shown, and they may be adjusted in a similar manner to that described for the ring 33 in Figs. 7 and 8. It is obvious that the method of adjustment will vary greatly with the construction, and I do not confine myself as regards this part of my invention to the construction herein described.

According to another part of my invention, I provide for governing the speed of the turbine by varying the dimensions of the nozzle; in such a case, the movable portions of the nozzles by means of which the dimensions are varied are connected to a governor of any suitable type, a centrifugal governor 46, for example, (see Fig. 11), so that an alteration in the turbine speed will expand or contract all the nozzles and thereby alter the velocity of the issuing jet of steam. In the arrangement illustrated in Fig. 11, the governor collar 47 is connected to a sleeve 48 the respective ends of which are provided with bevel friction pinions 49 and 50. A shaft 51, mounted in suitable bearings, is provided, at one end, with a bevel friction wheel 52 in position to be engaged by either the pinion 49 or the pinion 50 when the sleeve 48 is moved by the governor a sufficient distance in the proper direction and, at its other end, with a bevel gear wheel 53 which meshes with a pinion 54 that, in turn, meshes with a bevel gear wheel on the shaft 38. It will be seen that the nozzle adjusting mechanism will be thus operated in accordance with the speed of the turbine, since the governor will respond to changes in speed and will thus be the means of effecting a proper adjustment of the ring 10.

It will be understood that the manner of carrying out this part of my invention may be considerably varied and that I am not restricted to the means shown in Fig. 11 of the drawings. The normal dimensions of the nozzles are, of course, adjusted so as to obtain maximum efficiency when the turbine is running at normal speed and under normal conditions of load. By this arrangement, the ordinary governor used for varying the speed of a turbine by varying the time during which steam is admitted to the nozzles will, of course, be dispensed with, and steam will be at all times freely admitted to the space 3 communicating with the entrances to the nozzles.

I claim as my invention:

1. In an elastic fluid turbine, the combination of a rotatable member having blades or buckets and a stationary casing, a member carried by said casing and provided with slots which form fluid passages and means for moving said slotted member to adjust the size of said passages.

2. In an elastic fluid turbine, the combination of a rotatable member having blades or buckets and a casing, a member carried by said casing and provided with slots forming fluid passages and directing vanes formed integrally with said slotted member.

3. In a fluid-pressure turbine, the combination with a movable member having impact buckets, of a stationary member having inwardly discharging supply nozzles formed between two relatively movable parts one of which is provided with a worm-thread, and a rotatable shaft having a worm engaging with said worm-thread to adjust said part in order to vary the size of the nozzles.

4. In a fluid-pressure turbine, the combination with a rotatable member having annular sets of blades or buckets extending in opposite directions from the center and having channels extending between the inner sets of blades or buckets, of a stationary member having nozzles the outlet ends of which open into said channels.

5. In a fluid-pressure turbine, the combination with a stationary member having supply nozzles, of a rotatable member having annular sets of blades or buckets and channels or recesses which constitute extensions of the nozzles and project between two adjacent sets of blades or buckets.

6. In an elastic fluid turbine, a nozzle comprising oppositely disposed members provided with oppositely disposed slots, which coöperate to form fluid delivery passages, and means for moving one of said members to adjust the size of said nozzles.

7. In a fluid-pressure turbine, the combination with a rotatable member having impact buckets, of a stationary member having inwardly discharging supply nozzles formed between two relatively movable parts, worm gearing for moving one of said parts toward or away from the other, a speed governor and gearing between the same and the said worm gearing.

8. In a fluid-pressure turbine, the combination with a stationary member having inwardly discharging supply nozzles, of a rotatable member provided with impact buckets having dove-tail connection with their support and end rings for clamping said buckets in position.

9. In a fluid-pressure turbine, the combination with a stationary member having one or more supply nozzles, of a drum having longitudinal recesses and dove-tail grooves, blades or buckets having dove-tail projections fitting into said grooves and end rings which abut against said blades or buckets and are locked in position.

10. In a fluid-pressure turbine, the combination with a stationary member having supply nozzles, of a rotatable member having blades or buckets and having an annular set of channels between two adjacent annular sets of blades or buckets which receive the fluid from the nozzles and direct it against the blades or buckets.

11. In a fluid-pressure turbine, the combination with a stationary member having supply nozzles, of a rotatable member having annular sets of blades and having an annular set of channels between the two middle sets of blades, and of substantially the same depth as the blades, which receive the fluid from the nozzles and direct it against the blades.

12. A sectional nozzle for elastic fluid turbines, comprising a plurality of nozzle passages, each passage having two parallel walls and two divergent walls, and means for adjusting the size of said nozzles by moving one of said parallel walls.

13. In an elastic fluid turbine, a nozzle comprising two parallel walls and two divergent walls, and automatic means for moving one of said parallel walls to adjust the size of said nozzle.

14. In an elastic fluid turbine, the combination of a rotor provided with blades or buckets, a stationary casing surrounding said rotor, a member carried by said casing and provided with slots which form inwardly delivering fluid nozzles for said turbine, and means for moving said member to adjust the size of said nozzles.

15. In a double flow turbine, an initial stage comprising inwardly discharging expansion nozzles and peripheral impulse buckets receiving motive fluid therefrom, a secondary stage comprising radially extending impulse blades located at each side of the initial stage and receiving motive fluid therefrom, and a final stage which is divided into sections and is located at each side of said intermediate stage and which receives motive fluid therefrom.

In testimony whereof, I have hereunto subscribed my name this 23rd day of February, 1904.

CONRAD REGENBOGEN.

Witnesses:
JNO. R. THORNHILL,
JAS. STEWART BROADFOOT.